United States Patent
Chang et al.

(10) Patent No.: US 9,457,686 B2
(45) Date of Patent: Oct. 4, 2016

(54) METHOD TO ADJUST BATTERY MINIMUM STATE OF CHARGE LIMITS BASED ON BATTERY POWER CAPABILITY

(71) Applicant: Ford Global Technologies, LLC, Dearborn, MI (US)

(72) Inventors: Xiaoguang Chang, Northville, MI (US); Chuan He, Northville, MI (US); Xu Wang, Dearborn, MI (US)

(73) Assignee: Ford Global Technology, LLC, Dearborn, MI (US)

( * ) Notice: Subject to any disclaimer, the term of this patent is extended or adjusted under 35 U.S.C. 154(b) by 28 days.

(21) Appl. No.: 14/264,554

(22) Filed: Apr. 29, 2014

(65) Prior Publication Data
US 2015/0306971 A1 Oct. 29, 2015

(51) Int. Cl.
*B60L 9/00* (2006.01)
*B60L 11/18* (2006.01)

(52) U.S. Cl.
CPC .................. *B60L 11/1862* (2013.01)

(58) Field of Classification Search
CPC .... B60W 10/06; B60W 10/26; B60W 20/00; G03G 9/09775
USPC ....... 701/22; 180/65.265; 320/101, 162, 116
See application file for complete search history.

(56) References Cited

U.S. PATENT DOCUMENTS

| 6,362,598 | B2 | 3/2002 | Laig-Horstebrock et al. |
| 7,053,588 | B2 * | 5/2006 | Nakanishi et al. ............ 320/104 |
| 8,148,952 | B2 * | 4/2012 | Schaffnit ........................ 320/162 |
| 8,159,188 | B2 | 4/2012 | Anderson |
| 2010/0154524 | A1 * | 6/2010 | Salman ............... F02N 11/0859 73/114.59 |
| 2011/0168462 | A1 * | 7/2011 | Stanek et al. ................ 180/65.1 |
| 2012/0316810 | A1 | 12/2012 | Syed et al. |
| 2014/0149019 | A1 * | 5/2014 | Martin et al. ................. 701/103 |

* cited by examiner

*Primary Examiner* — Gertrude Arthur Jeanglaud
(74) *Attorney, Agent, or Firm* — David Kelley; Brooks Kushman P.C.

(57) ABSTRACT

A hybrid-electric vehicle includes a traction battery. A controller may operate the traction battery within certain state of charge and voltage limits. The controller may define a minimum operating voltage or state of charge below which no power may be requested from the traction battery. The minimum voltage and state of charge may be based on an electrical resistance of the traction battery. The voltage may also be based on a minimum power level required to crank the engine while meeting emissions standards. As the battery ages, the minimum voltage level may be adjusted such that the minimum power level is available at the minimum voltage level.

20 Claims, 5 Drawing Sheets

METHOD TO ADJUST BATTERY MINIMUM STATE OF CHARGE LIMITS BASED ON BATTERY POWER CAPABILITY

TECHNICAL FIELD

This application generally relates to setting state of charge limits of a traction battery.

BACKGROUND

A hybrid-electric vehicle includes a traction battery for supplying power for propulsion. To maximize battery life, the traction battery may be operated within a limited state of charge (SOC) range. As the battery ages, the power capability of the battery may be reduced. An SOC range selected at the beginning of battery life may not be adequate as the battery ages. A battery controller may attempt to compensate for battery aging by modifying the SOC range that is allowed. Battery controllers may adjust the operational SOC window to ensure that a maximum amount of power is available within the SOC window. This maximum amount of power may decrease as the battery ages, but the controller may attempt to select an SOC range in which the battery may provide power for propulsion. The focus of certain prior control schemes is to select the SOC range in which the traction battery may supply power for propulsion.

SUMMARY

A vehicle includes a traction battery and at least one controller. The controller is programmed to operate the traction battery according to a minimum state of charge based on an electrical resistance and a predetermined minimum power such that the predetermined minimum power is available at the minimum state of charge for engine cranking. Below the minimum state of charge no power is requested from the traction battery for propulsion. The electrical resistance may include an internal resistance of the traction battery. The electrical resistance may include a wiring resistance associated with a harness connected to the traction battery. The predetermined minimum power may include a safety margin such that a predetermined amount of power is available for engine cranking after a predetermined amount of time in which the vehicle is not operated. The at least one controller may be further programmed to estimate the electrical resistance. The electrical resistance may be based on one or more of an age and a usage of the traction battery. The electrical resistance may be based on one or more of a temperature and a state of charge of the battery. The minimum state of charge may be further based on a maximum current of the traction battery. The predetermined minimum power may be selected to reduce emissions during engine cranking.

A controller-implemented method includes operating, by a controller, a traction battery according to a minimum state of charge based on a resistance of the traction battery and a minimum power capability such that a predetermined minimum power is available at the minimum state of charge for engine cranking, wherein no power is requested from the traction battery for propulsion when a state of charge is below the minimum state of charge. The method may further include estimating, by the controller, the resistance of the traction battery. The predetermined minimum power may be a minimum power required to meet emissions standards during engine cranking. The predetermined minimum power may include a safety margin such that a predetermined amount of power is available for cranking after a predetermined amount of time in which the traction battery is not operated.

A vehicle includes a traction battery and at least one controller. The at least one controller is programmed to operate the traction battery according to a minimum voltage based on an electrical resistance and a predetermined power such that the predetermined power is available at the minimum voltage for engine cranking, wherein no power is requested from the traction battery for propulsion when a voltage of the traction battery is less than the minimum voltage. Power may be requested from the traction battery for engine cranking below the minimum voltage, in which case, emissions requirements may not be met. The minimum voltage may be further based on a maximum current of the traction battery, such that when the maximum current is less than a battery current associated with a maximum battery power capability, the minimum voltage is set to Pmin/Imax−R*Imax, where Pmin is the predetermined power, Imax is the maximum current, and R is the electrical resistance. The minimum voltage may be further based on a maximum current of the traction battery, such that when the maximum current is greater than a battery current associated with a maximum battery power capability, the minimum voltage is set to square root of 4*R*Pmin, where Pmin is the predetermined power and R is the electrical resistance. The predetermined power may be selected to reduce emissions during engine cranking. The predetermined power may be selected to meet emissions standards during engine cranking and operation. The predetermined power may include a safety margin such that a predetermined amount of power is available for engine cranking after a predetermined amount of time in which the vehicle is not operated. The at least one controller may be further programmed to estimate the electrical resistance of the traction battery. The electrical resistance of the traction battery may be based on a time in service of the traction battery. The at least one controller may be further programmed to operate the traction battery according to a minimum state of charge based on the minimum voltage, wherein no power is requested from the traction battery when a state of charge of the traction battery is less than the minimum state of charge.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
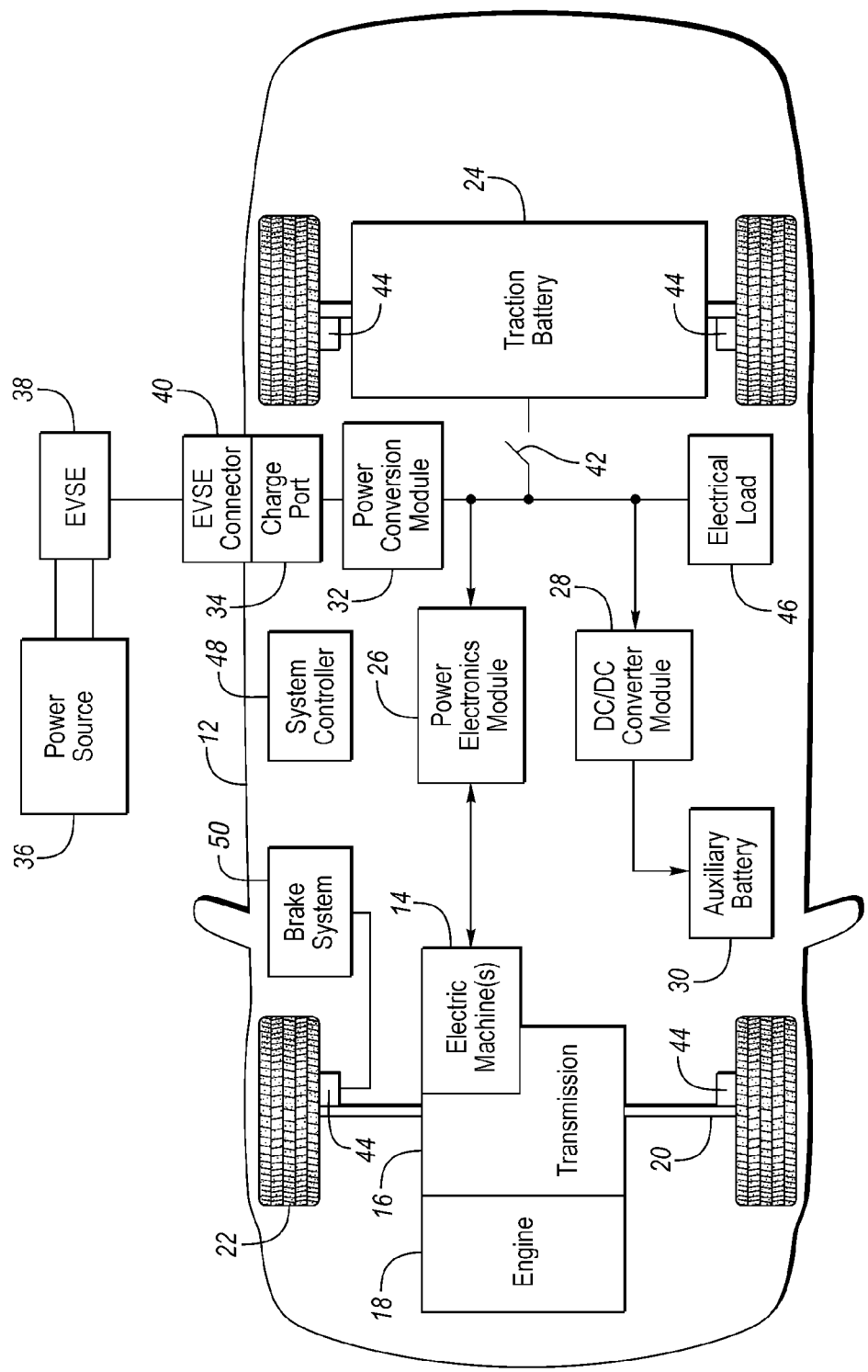
FIG. 1 is a diagram of a hybrid vehicle illustrating typical drivetrain and energy storage components.

FIG. 1 depicts a typical plug-in hybrid-electric vehicle (HEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high voltage DC output. The traction battery 24 is electrically connected to one or more power electronics modules. One or more contactors 42 may isolate the traction battery 24 from other components when opened and connect the traction battery 24 to other components when closed. A power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may require a three-phase AC current to function. The power electronics module 26 may convert the DC voltage to a three-phase AC current as required by the electric machines 14. In a regenerative mode, the power electronics module 26 may convert the three-phase AC current from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. The low-voltage systems may be electrically connected to an auxiliary battery 30 (e.g., 12V battery). One or more electrical loads 46 may be connected to the high-voltage bus. The electrical loads 46 may have an associated controller that operates the electrical load 46 when appropriate. Examples of electrical loads 46 may be a heating module or an air-conditioning module.

The vehicle 12 may be an electric vehicle or a plug-in hybrid vehicle in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components that are required to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 to achieve desired operation. The brake system 50 may respond to driver commands and may also operate autonomously to implement features such as stability control. The controller of the brake system 50 may implement a method of applying a requested brake force when requested by another controller or sub-function.

The various components discussed may have one or more associated controllers to control and monitor the operation of the components. The controllers may communicate via a serial bus (e.g., Controller Area Network (CAN)) or via discrete conductors. In addition, a system controller 48 may be present to coordinate the operation of the various components.

Figure 2:
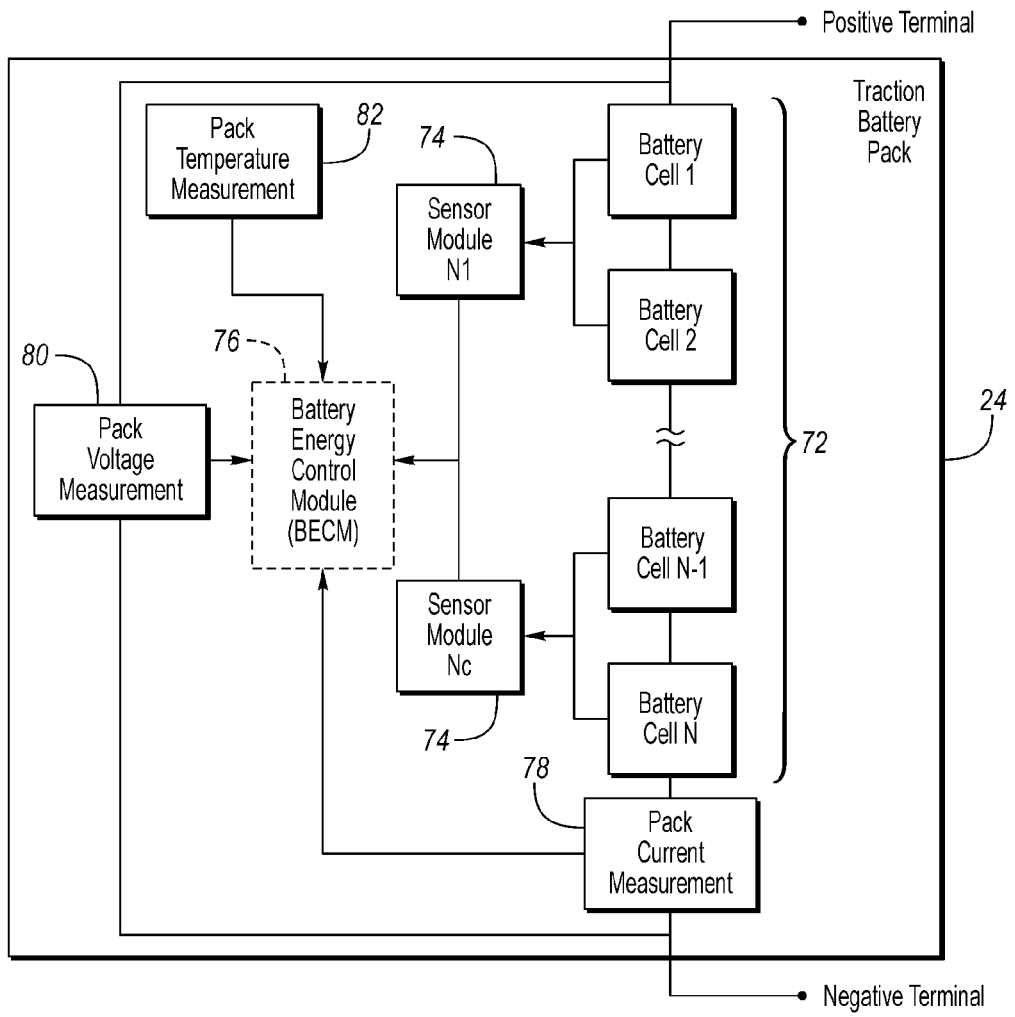
FIG. 2 is a diagram of a possible battery pack arrangement comprised of multiple cells, and monitored and controlled by a Battery Energy Control Module.

A traction battery 24 may be constructed from a variety of chemical formulations. Typical battery pack chemistries may be lead acid, nickel-metal hydride (NIMH) or Lithium-Ion. FIG. 2 shows a typical traction battery pack 24 in a simple series configuration of N battery cells 72. Other battery packs 24, however, may be composed of any number of individual battery cells connected in series or parallel or some combination thereof. A typical system may have one or more controllers, such as a Battery Energy Control Module (BECM) 76 that monitors and controls the performance of the traction battery 24. The BECM 76 may monitor several battery pack level characteristics such as pack current 78, pack voltage 80 and pack temperature 82. The BECM 76 may have non-volatile memory such that data may be retained when the BECM 76 is in an off condition. Retained data may be available upon the next key cycle.

In addition to the pack level characteristics, there may be battery cell 72 level characteristics that are measured and monitored. For example, the terminal voltage, current, and temperature of each cell 72 may be measured. A system may use a sensor module 74 to measure the battery cell 72 characteristics. Depending on the capabilities, the sensor module 74 may measure the characteristics of one or multiple of the battery cells 72. The battery pack 24 may utilize up to N, sensor modules 74 to measure the characteristics of all the battery cells 72. Each sensor module 74 may transfer the measurements to the BECM 76 for further processing and coordination. The sensor module 74 may transfer signals in analog or digital form to the BECM 76. In some embodiments, the sensor module 74 functionality may be incorporated internally to the BECM 76. That is, the sensor module 74 hardware may be integrated as part of the circuitry in the BECM 76 and the BECM 76 may handle the processing of raw signals.

It may be useful to calculate various characteristics of the battery pack. Quantities such a battery power capability and battery state of charge may be useful for controlling the operation of the battery pack as well as any electrical loads receiving power from the battery pack. Battery power capability is a measure of the maximum amount of power the battery can provide or the maximum amount of power that the battery can receive. Knowing the battery power capability allows electrical loads to be managed such that the power requested is within limits that the battery can handle.

Battery pack state of charge (SOC) gives an indication of how much charge remains in the battery pack. The battery pack SOC may be output to inform the driver of how much charge remains in the battery pack, similar to a fuel gauge. The battery pack SOC may also be used to control the operation of an electric or hybrid-electric vehicle. Calculation of battery pack SOC can be accomplished by a variety of methods. One possible method of calculating battery SOC is to perform an integration of the battery pack current over time. This is well-known in the art as ampere-hour integration. One possible disadvantage to this method is that the current measurement may be noisy. Possible inaccuracy in the state of charge may occur due to the integration of this noisy signal over time.

Figure 3:
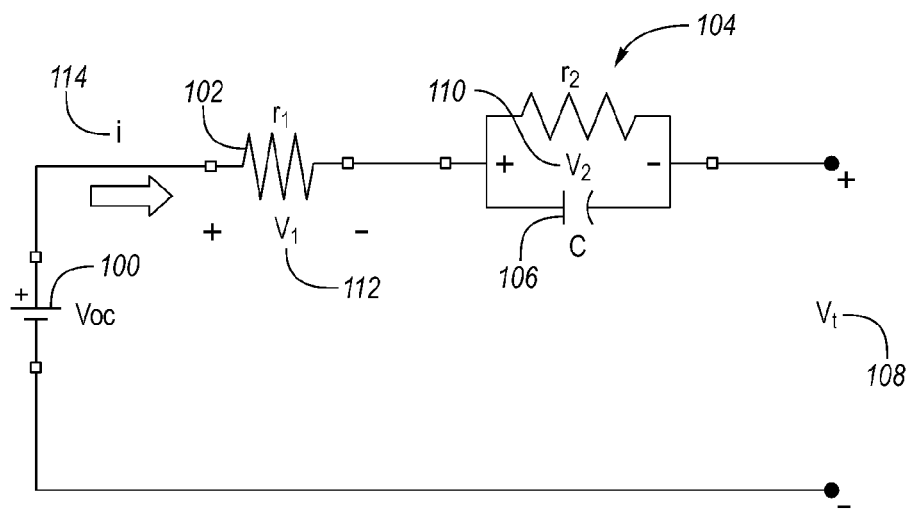
FIG. 3 is a diagram of an example battery cell equivalent circuit.

A battery cell may be modeled as a circuit. FIG. 3 shows one possible battery cell equivalent circuit model (ECM). A battery cell may be modeled as a voltage source ($V_{oc}$) 100 having associated resistances (102 and 104) and capacitance 106. $V_{oc}$ 100 represents the open-circuit voltage of the battery. The model includes an internal resistance, $r_1$ 102, a charge transfer resistance, $r_2$ 104, and a double layer capacitance, C 106. The voltage $V_1$ 112 is the voltage drop across the internal resistance 102 due to current 114 flowing through the circuit. The voltage $V_2$ 110 is the voltage drop across the parallel combination of $r_2$ and C due to current 114 flowing through the combination. The voltage $V_t$ 108 is the voltage across the terminals of the battery (terminal voltage).

Because of the battery cell impedance, the terminal voltage, $V_t$ 108, may not be the same as the open-circuit voltage, $V_{oc}$ 100. The open-circuit voltage, $V_{oc}$ 100, may not be readily measurable as only the terminal voltage 108 of the battery cell is accessible for measurement. When no current 114 is flowing for a sufficiently long period of time, the terminal voltage 108 may be the same as the open-circuit voltage 100. A sufficiently long period of time may be necessary to allow the internal dynamics of the battery to reach a steady state. When current 114 is flowing, $V_{oc}$ 100 may not be readily measurable and the value may need to be inferred based on the battery SOC. The impedance parameter values, $r_1$, $r_2$, and C may be known or identified by an online estimation strategy. The value of the parameters may depend on the battery chemistry, the age of the battery, and/or the operating condition of the battery including temperature, SOC, and current.

Figure 4:
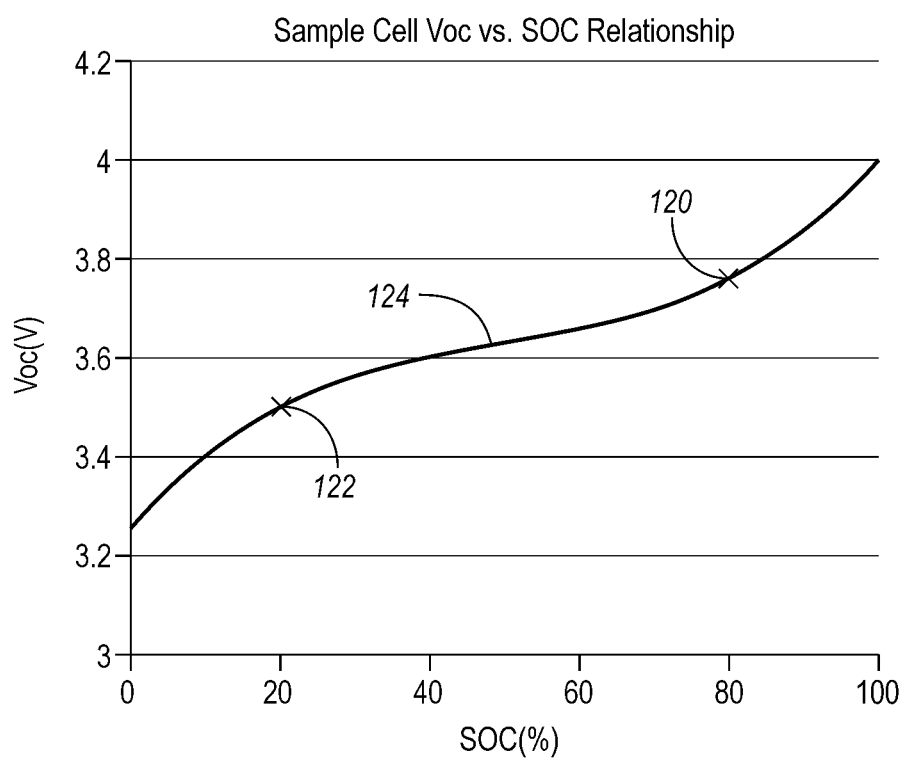
FIG. 4 is a graph that illustrates a possible open-circuit voltage (Voc) vs. battery state of charge (SOC) relationship for a typical battery cell.

For a typical Lithium-Ion battery cell, there is a relationship between SOC and the open-circuit voltage ($V_{oc}$) such that $V_{oc}$=f(SOC). FIG. 4 shows a typical curve 124 showing the open-circuit voltage $V_{oc}$ as a function of SOC. The relationship between SOC and $V_{oc}$ may be determined from an analysis of battery properties or from testing the battery cells. The function may be such that SOC may be calculated as $f^{-1}(V_{oc})$. The function or the inverse function may be implemented as a lookup table or an equivalent equation within a controller. The exact shape of the curve 124 may vary based on the particular formulation of the Lithium-Ion battery. The voltage $V_{oc}$ changes as a result of charging and discharging of the battery.

The battery impedance parameters $r_1$, $r_2$, and C may change over operating conditions of the battery. The values may vary as a function of the battery temperature. For example, the resistance values, $r_1$ and $r_2$, may decrease as temperature increases and the capacitance, C, may increase as the temperature increases. The impedance values may also depend on the state of charge of the battery. The impedance values may change with age and/or usage of the battery.

The battery impedance parameter values, $r_1$, $r_2$, and C may also change over the life of the battery. For example, the resistance values may increase over the life of the battery. The increase in resistance may vary as a function of temperature and state of charge over the life of battery. Higher battery temperatures may cause a larger increase in battery resistance over time. For example, the resistance for a battery operating at 80 C may increase more than the resistance of a battery operating at 50 C over a period of time. At a constant temperature, the resistance of a battery operating at 90% state of charge may increase more than the resistance of a battery operating at 50% state of charge. These relationships may be battery chemistry dependent.

A vehicle power system using constant values of the battery impedance parameters may inaccurately calculate other battery characteristics such as state of charge and battery power capability. In practice, it may be desirable to estimate the impedance parameter values during vehicle operation so that changes in the parameters are continually be accounted for. A model may be utilized to estimate the various impedance parameters of the battery.

One possible model may be the equivalent circuit model of FIG. 3. The governing equations for the equivalent model may be written as:

$$\dot{V}_2 = -\frac{1}{r_2 C} V_2 + \frac{1}{C} * i \qquad (1)$$

$$V_t = V_{oc} - V_2 - r_1 * i \qquad (2)$$

where i is the current, and $\dot{V}_2$ is the time based derivative of $V_2$. The method proposed may be applied to both an individual battery cell and the battery pack. For a battery cell level application, the variables $V_{oc}$, $V_t$, $V_2$, $r_1$, $r_2$, and C may be parameters associated with the battery cell. For a battery pack level application, these variables may be parameters associated with the battery pack. For example, when battery cells are serially connected, the battery pack level $V_{oc}$ may be obtained by summing the individual cell values of $V_{oc}$.

Referring to the model of FIG. 3, various values may be measured on a per-cell basis or on an overall pack basis. For example, the terminal voltage, $V_t$ 108, may be measured for each cell of the traction battery. Assuming serially connected cells, the current, i 114, may be measured for the entire traction battery since the same current may flow through each cell. Different pack configurations may use different combinations of measurements. The estimation model may be performed for the entire battery pack or for each cell and the cell values may then be combined to arrive at an overall pack value.

The value of $V_{oc}$ in equation (2) may be calculated based on the state of charge. The state of charge may be derived using an ampere-hour integration of the current 114. The open-circuit voltage 100 may then be calculated based on FIG. 4 from the state of charge value. An initial state of charge value may be found from FIG. 4 based on an open-circuit voltage reading after the battery has been resting for a sufficient amount of time.

The impedance parameter values may change overtime. One possible implementation may utilize an Extended Kalman Filter (EKF) to recursively estimate the parameter values. An EKF is a dynamic system, that is governed by equations of the following form:

$$x_k = f(x_{k-1}, u_{k-1}, w_{k-1}) \quad (3)$$

$$z_k = h(x_k, v_{k-1}) \quad (4)$$

where: $x_k$ may include the state $V_2$ and the other battery ECM parameters; $u_k$ is the input (e.g., battery current); $w_k$ is the process noise; $z_k$ may be the output (e.g., $V_{oc}-V_t$); and $v_k$ is the measurement noise.

One possible set of states for the governing equations for the equivalent model may be chosen as follows:

$$x = \begin{bmatrix} x_1 \\ x_2 \\ x_3 \\ x_4 \end{bmatrix} = \begin{bmatrix} V_2 \\ 1/(r_2 C) \\ 1/C \\ r_1 \end{bmatrix} \quad (5)$$

Based on this choice of states, the discrete-time corresponding state space equations of equations (3) and (4) for the ECM model governed by equations (1) and (2) may be expressed in the form of Equations (6) and (7).

$$f(x_k, u_k) = \begin{bmatrix} (1 - T_s x_2(k)) x_1(k) + T_s x_3(k) i(k) \\ x_2 \\ x_3 \\ x_4 \end{bmatrix} \quad (6)$$

$$h(x_k, u_k) = x_1(k) + x_4(k) i(k) \quad (7)$$

where $T_s$ is a sampling time.

Based on the system model described, an observer, for example an EKF, may be designed to estimate the extended states ($x_1$, $x_2$, $x_3$ and $x_4$). Once the states are estimated, the voltage and impedance parameter values ($V_2$, $r_1$, $r_2$, and C) may be calculated as a function of the states as follows:

$$\hat{V}_2 = x_1 \quad (8)$$

$$\hat{r}_1 = x_4 \quad (9)$$

$$\hat{r}_2 = x_3/x_2 \quad (10)$$

$$\hat{C} = 1/x_3 \quad (11)$$

The complete set of EKF equations consists of time update equations and measurement update equations. The EKF time update equations project the state and covariance estimate from the previous time step to the current time step:

$$\hat{x}_k^- = f(\hat{x}_{k-1}, u_{k-1}) \quad (12)$$

$$P_k^- = A_k P_{k-1} A_k^T + W_k Q_{k-1} W_k^T \quad (13)$$

where: $\hat{x}_k^-$ represents a priori estimate of $x_k$; $P_k^-$ represents a priori estimate error covariance matrix; $A_k$ represents the Jacobian matrix of the partial derivatives of f(x, u, w) with respect to x; $P_{k-1}$ represents a posteriori estimate error matrix of last step; $A_k^T$ represents transpose of matrix $A_k$; $W_k$ represents the Jacobian matrix of the partial derivatives of f(x, u, w) with respect to process noise variable w; $Q_{k-1}$ represents a process noise covariance matrix, and $W_k^T$ represents transpose of matrix $W_k$.

The matrix $A_k$ may be constructed from the set of state equations defined by equation (14). The input, u, in this case, may include the current measurement, i.

$$A_k = \begin{bmatrix} 1 - T_s x_2(k) & -T_s x_1(k) & T_s i(k) & 0 \\ 0 & 1 & 0 & 0 \\ 0 & 0 & 1 & 0 \\ 0 & 0 & 0 & 1 \end{bmatrix} \quad (14)$$

The measurement update equations correct the state and covariance estimate with the measurement:

$$K_k = P_k^- H_k^T (H_k P_k^- H_k^T + V_k R_k V_k^T)^{-1} \quad (15)$$

$$\hat{x}_k = \hat{x}_k^- + K_k (z_k - h(\hat{x}_k^-, u_k)) \quad (16)$$

$$P_k = (I - K_k H_k) P_k^- \quad (17)$$

where: $K_k$ represents the EKF gain; $H_k$ represents the Jacobian matrix of the partial derivatives of h with respect to x; $H_k^T$ is the transpose of $H_k$; $R_k$ represents a measurement noise covariance matrix; $V_k$ represents the Jacobian matrix of the partial derivatives of h with respect to measurement noise variable v; $z_k$ represents the measured output values; and $V_k^T$ is the transpose of $V_k$.

In the EKF model, the resistance and capacitance parameters may be assumed to be slowly varying and have a derivative of approximately zero. The estimation objective may be to identify the time-varying values of the circuit parameters. In the above model, three impedance parameters may be identified: $r_1$, $r_2$, and C. More comprehensive models may additionally estimate $V_{oc}$ as a time-varying parameter. Other model formulations may incorporate a second RC pair to represent a slow and a fast voltage recovery dynamics. These formulations may increase the number of states in the model.

One of ordinary skill in the art can construct and implement the EKF given a set of model equations. The system of equations described above is one example of a system model for a battery system. Other formulations are possible and the methods described will work equally well on other formulations.

In the above example, i and $V_t$ may be measured quantities. The quantity $V_{oc}$ may be derived from the state of charge which may be calculated using an ampere-hour integration of current. Once $V_2$ and $r_1$ are estimated, the battery terminal voltage may be estimated as:

$$\hat{V}_t = V_{oc} - \hat{V}_2 - \hat{r}_1 * i \tag{18}$$

The above described estimation functionality is one technique of estimating the battery impedance parameters. The following discussion is equally applicable to other methods of estimating the parameters.

Using this model, a total traction battery resistance may be calculated as the sum of $r_1$ and $r_2$.

A useful quantity that may be utilized in battery systems is the battery power capability. Battery power capability may be the amount of power that the battery is capable of supplying or receiving. A separate battery power capability may be defined for charging and discharging. Battery power capability may be expressed as a function of state of charge or open-circuit voltage. That is, the battery power capability may have a different value for different states of charge. A traction battery system is normally designed such that the battery power capability is greater than the amount of power that the battery will need to provide at any given time. Due to battery aging effects the battery power capability may decrease as the battery ages. In order to meet warranty and driver expectations, it is prudent to design the battery such that it can still meet vehicle demands as the battery ages.

In order to improve battery life, a traction battery may be designed to operate in a specific range of SOC. The SOC range may be defined to meet battery life and vehicle performance requirements. A typical hybrid-electric vehicle may use a specific middle range of SOC values. For example, a hybrid-electric vehicle may operate in an SOC range between 35% and 75% SOC. SOC may be controlled to not be less than a lower SOC limit (e.g., 35%) and to not be greater than an upper SOC limit (e.g., 75%). The limits may be specified in terms of voltage or SOC since voltage and SOC are related (see FIG. 4).

Figure 5:
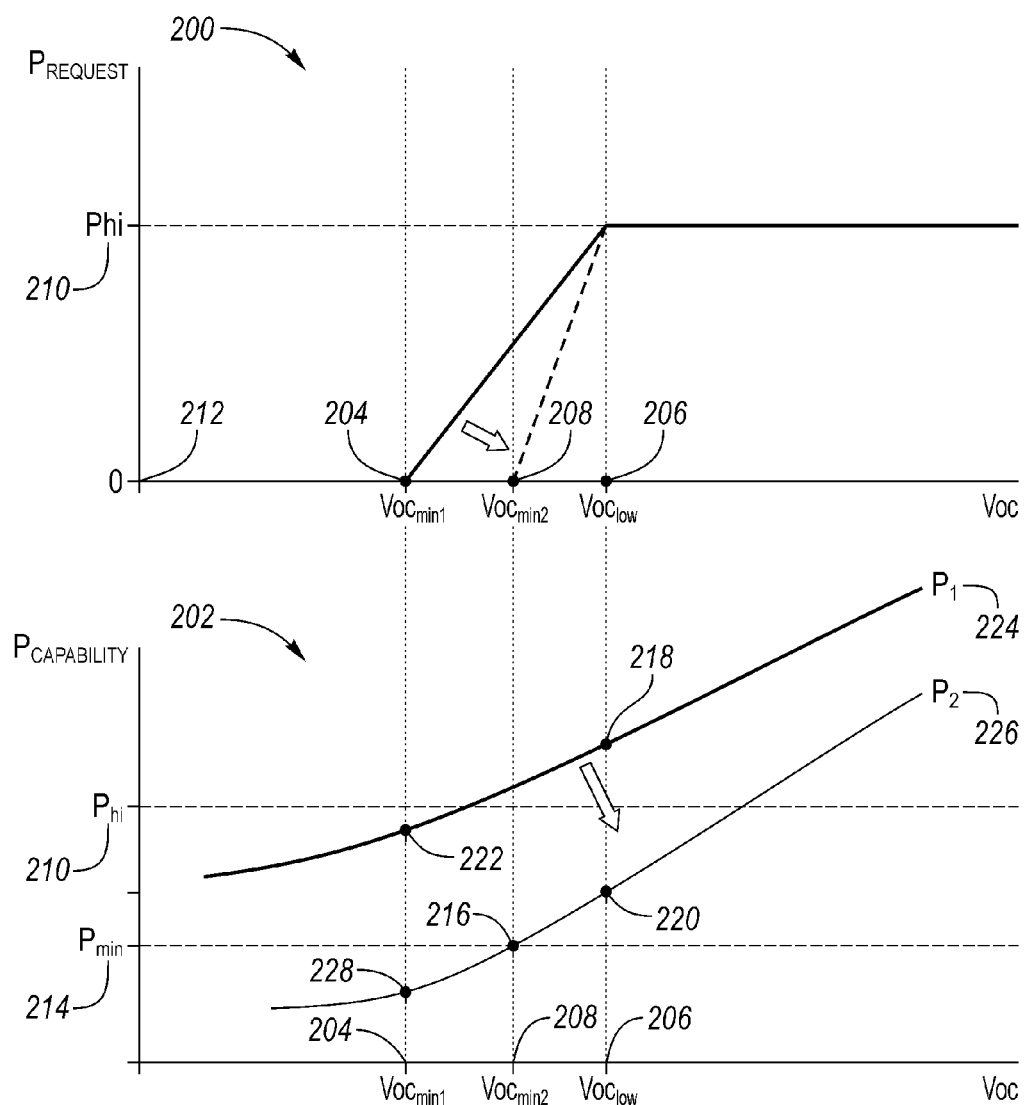
FIG. 5 is an example plot of requested battery power and battery power capability as a function of a battery open-circuit voltage.

Battery power may be limited as a function of battery open-circuit voltage as shown in FIG. 5. A minimum voltage, $VOC_{min1}$ 204, may be defined, below which no electrical power may be used for propulsion of the vehicle. Below the minimum voltage 204, the vehicle may be operated solely using engine power. The engine power may be used to recharge the traction battery to increase the voltage and state of charge. At a certain low voltage value, $VOC_{low}$ 206, a maximum power level, $P_{hi}$ 210, from the battery may be requested. The low voltage value, $VOC_{low}$ 206, may be defined as the lowest voltage for requesting full power. Full power may be drawn from the battery for voltage values above the low voltage value. The power level may be ramped down between the low voltage value 206 for full power and the minimum voltage 204 to ensure smooth decay in battery power usage.

The power level at the minimum voltage 204 may be defined such that a minimum performance standard is met. At the lowest voltage value 206, power may be requested from and supplied by the battery. The power supplied at this operating point may ensure a minimum desired level of vehicle performance. The minimum power level may be selected to ensure that the vehicle meets emissions standards. The minimum power level may also be selected in an all-electric vehicle such that there is enough power to propel the vehicle for a short distance in emergency situations. For example, the power level may be selected so that a vehicle may move through a railroad crossing should the vehicle be stopped on the tracks. This low voltage value 206 may be distinguished from the minimum voltage limit 204 at which no power may be requested from or supplied by the battery.

The above discussion may substitute SOC values for the open-circuit voltage values and remain applicable. In the case of SOC, a minimum SOC value may be defined such that for states of charge below the minimum SOC value, no power may be requested from the traction battery. Likewise, a low SOC value may be defined corresponding to the low voltage value.

Some systems may change the lowest SOC for full power operating point as the battery ages while leaving the minimum SOC at a constant value. For improved battery life, it may be preferable to operate a new battery at lower SOC values assuming that the battery power level meets vehicle requirements. As the battery ages, the minimum SOC value and/or the lowest SOC for full power may be adjusted to meet vehicle power requirements.

Battery power capability may be modeled using the equivalent circuit model of FIG. 3. For steady-state power capability, any transient or dynamic model elements may be ignored. The power output of a battery may be defined as:

$$P_{out} = V_{oc}i - Ri^2 \tag{19}$$

where R is a total resistance of the battery which may be the sum of $r_1$ and $r_2$.

As the battery ages, the resistance of the battery may increase. Resistance changes affect the power output of the battery pack. As the resistance increases, more power is lost in the resistance of the battery. This tends to reduce the battery power output and the battery power capability. In addition to changing due to aging, the resistance of the battery may vary as the battery temperature changes.

The battery power capability may be calculated by determining the maximum power output of the battery. The maximum power output of the battery can be found by calculating the maximum power that the battery may provide. Taking the derivative of equation (19) and setting it to zero, the following expression is found:

$$\frac{dP_{out}}{di} = V_{oc} - 2Ri = 0 \tag{20}$$

Solving for i yields:

$$I_{max} = \frac{V_{oc}}{2R} \tag{21}$$

At this value of current, the power output may be a maximum. Plugging this value back into equation (19) yields the following expression for the maximum power output:

$$P_{max} = \frac{V_{oc}^2}{4R} \tag{22}$$

It is clear from equation (22) that as the resistance, R, increases, the maximum power that the battery can provide decreases. Since $V_{oc}$ is related to SOC, the maximum power may also be expressed as a function of SOC (see FIG. 4). The maximum power output described may also be referred to at the battery power capability.

To meet certain vehicle performance requirements, a certain amount of battery power may be desired. For example, a predetermined amount of battery power may be needed to start the engine. As another example, a predetermined amount of battery power may be needed to meet emissions requirements during engine cranking. A predetermined amount of battery power may be needed to meet emissions at start up. For example, battery power may be needed to propel the vehicle or pre-heat emissions related components. In addition, the availability of battery power helps to meet fuel economy goals and improve vehicle performance. It is desired to maintain vehicle performance as much as possible as battery power capability decreases over time. Meeting vehicle performance goals over the life of the vehicle may improve customer satisfaction.

In general, the open-circuit voltage increases as SOC increases. As seen from equation (22), one way for the battery to provide more power is to operate at a higher open-circuit voltage. This means operating at a higher state of charge value.

A minimum power requirement may be defined. This minimum power requirement may be based on basic emissions requirements or engine cranking requirements. This minimum power requirement may define a minimum acceptable battery power level to meet vehicle emissions during engine cranking. The minimum power requirement may be based on vehicle testing or analysis.

The minimum power requirement may be multiplied by a safety factor to provide an operating margin. The safety factor may be greater than one. This factor may provide a small tolerance so that SOC or voltage may fall below a minimum value and the minimum power requirement may still be met. This may be useful in a situation in which the vehicle is powered off at an SOC (or voltage) near the minimum limit. If the vehicle is not operated for a number of days, the SOC of the battery may decrease due to internal processes in the battery. The safety factor may be defined such that a resulting minimum open-circuit voltage (or SOC) is still valid after a period in which the vehicle is not used (e.g., 31 days in a parking lot).

A maximum current for the traction battery may be defined. A maximum battery current may be defined at each open-circuit voltage value based on an allowed minimum voltage at the terminals of the battery. A maximum battery current may be defined as follows:

$$I_{max} = \frac{V_{oc} - V_{t,min}}{R} \quad (23)$$

The maximum battery current may be the maximum current that can be supplied by the battery at a given open-circuit voltage and allowed minimum voltage at the terminals. The battery maximum current may also be defined in other ways. Battery current may be limited by current capacity of internal battery wiring. Battery current may also be limited by thermal requirements within the battery pack. A battery controller may implement a table of maximum current values for different open-circuit voltages. The battery controller may attempt to limit the current output to be less than or equal to the maximum allowed current. Equation (23) gives the maximum current that can be supplied without the terminal voltage falling below a minimum voltage threshold.

The maximum current may be further limited by other electrical components connected to the traction battery. Fuses and wiring may places limitations on the amount of current that may flow in the system. In some cases, these limitations may be less than the battery current limit of equation (23). In these situations, these limitations may control the maximum amount of current that can flow. In general, the minimum of the battery current limit and these alternative limitations may be used to define the maximum current.

In the above formulation of maximum battery current the value will decrease as the open-circuit voltage decreases. At lower open-circuit voltages, the battery may have less current capacity. The maximum battery current may also decrease as resistance increases.

The maximum battery current may be compared to the current at the maximum battery power output. If the maximum current, $I_{max}$, allowed by the battery pack is less than $V_{oc}/2R$, then the battery pack may not be able to provide the maximum power due to a maximum current limitation. The maximum power capability may be limited by the maximum allowed current. In this situation, the minimum open-circuit voltage may be expressed as follows:

$$V_{oc,min} = \frac{P_{min}}{I_{max}} + RI_{max} \quad (24)$$

where $I_{max}$ is the maximum current allowed by the battery pack. This provides the minimum open-circuit voltage value to meet the minimum power requirement. The corresponding SOC value may be derived from the relationship between the open-circuit voltage and the state of charge (see FIG. 4).

When the maximum current, $I_{max}$, allowed by the battery pack is greater than or equal to $V_{oc}/2R$, then the battery pack may be able to provide the maximum power. The power capability of the battery is not limited by the maximum allowed battery current. In this case, maximum power may be achieved at a current less than the maximum current. The maximum power may be set to the minimum power requirement to calculate the corresponding open-circuit voltage value. The minimum open-circuit voltage may be expressed as:

$$V_{oc,min} = \sqrt{4RP_{min}} \quad (25)$$

Utilizing equations (24) and (25), a minimum open-circuit voltage that meets the minimum power requirement may be determined. Once the minimum open-circuit voltage is known, a corresponding minimum SOC value may be found. The minimum SOC operating limit may be defined based on the minimum open-circuit voltage. The battery controller may execute an operating strategy to maintain battery SOC and voltage above this minimum operating limit in order to meet the minimum power requirement.

The above $P_{min}$ value used in equations (24) and (25) may be adjusted by a gain factor to provide a margin for the minimum open-circuit voltage. The minimum power desired may be multiplied by the gain factor. The gain factor may be a value greater than or equal to one to ensure some margin in the minimum power level.

The minimum SOC is the SOC value at which no power may be drawn from the battery during normal operation. The minimum SOC value ensures that the battery has enough power to crank the engine when needed. In addition, the power level at the minimum SOC may be defined such that the engine cranking meets emissions standards.

As the battery ages, the minimum SOC limit may increase in value. In addition, a maximum and minimum SOC bound may be defined. The calculated minimum SOC limit may be constrained to this range.

At the beginning of battery life, the battery power limits may be fixed at values that are below the maximum possible battery power capability. As the battery ages, the battery power capability may decrease below the beginning of life battery power limits.

The battery controller may estimate the battery impedance parameters as described above. By continuously executing the estimation model, the battery controller may obtain a value for the battery resistance that reflects the effects of aging and temperature. The resistance value may then be used to calculate the minimum battery voltage limit to meet the minimum power requirements of the vehicle. An advantage of this system is that the minimum voltage limit may be changed as the battery temperature changes. Thus, the battery may always have at least the minimum power level available at the minimum voltage value.

The resistance of the battery may also change with temperature. The real-time estimation of resistance may account for changes in battery temperature. The minimum SOC limit may be adjusted according the resistance as it varies with temperature. The minimum SOC limit at certain battery age and usage may be independent of temperature.

FIG. 5 depicts an example of moving the minimum voltage level to meet the minimum power capability. A first plot 200 of available request power as a function of the open-circuit voltage is shown. At voltage less than a minimum voltage, $VOC_{min1}$ 204, no power may be requested from the traction battery for propulsion. For a hybrid vehicle, a mode of operation may be entered in which all power for propulsion is derived from the engine. An electric machine may be operated as a generator in this situation in order to raise the battery SOC to a higher level. This minimum voltage 204 may be selected to improve battery life. At a higher voltage, $VOC_{low}$ 206, the power that may be requested may be a normal power level, $P_{hi}$ 210. The normal level of power may be such that an electric machine may use power to propel the vehicle. At the power level, $P_{hi}$ 210, the traction battery may be capable of supplying the normal power level. At voltages greater than $V_{low}$ 206, the normal power level may be requested from the battery.

The second plot 202 shows a plot of power capability as a function of the open-circuit voltage. A first power capability plot, $P_1$ 224, may be a power capability near the beginning of battery life. At the voltage, $VOC_{low}$ 206, the power capability operating point 218 may be above the normal power level $P_{hi}$ 210. At the voltage, $VOC_{min1}$ 204, the power capability operating point 222 may be above a minimum power level 214.

As the battery ages, the power capability curve may shift downward, for example to curve $P_2$ 226. The power capability may decrease at all voltage levels as the battery ages. The corresponding power operating point 220 at $VOC_{low}$ may decrease and be less than the normal desired power level 210. In addition, the corresponding power operating point 228 at the minimum voltage, $VOC_{min1}$ 204, may be below the minimum power level $P_{min}$ 214. As described above, $P_{min}$ 214 may be selected to ensure that enough power is available at the minimum voltage to permit cranking of the engine while meeting emissions standards. Under this condition, the power available at the initial minimum voltage 204 may not be enough to crank the engine while meeting emissions requirements.

The minimum voltage level may be adjusted such that at the minimum voltage level, the minimum power $P_{min}$ 214 is achieved. This may be at voltage level $VOC_{min2}$ 208. At this operating point 216, the power capability is $P_{min}$ 214. No power should be requested from the traction battery below $VOC_{min2}$ 208. This moves the minimum voltage level to a higher value than previously. In addition, other logic may be implemented to select a new $VOC_{low}$ 206 voltage. One technique may be to move $VOC_{low}$ 206 when the difference between $VOC_{low}$ 206 and $VOC_{min2}$ 208 falls below a certain threshold. In general, it may be desirable to ramp down the available power request between $VOC_{low}$ and $VOC_{min}$ in order to provide smoother transitions. Note that the above discussion applies if the VOC values are depicted as state of charge values. In this case, corresponding SOC limits may be calculated.

Figure 6:
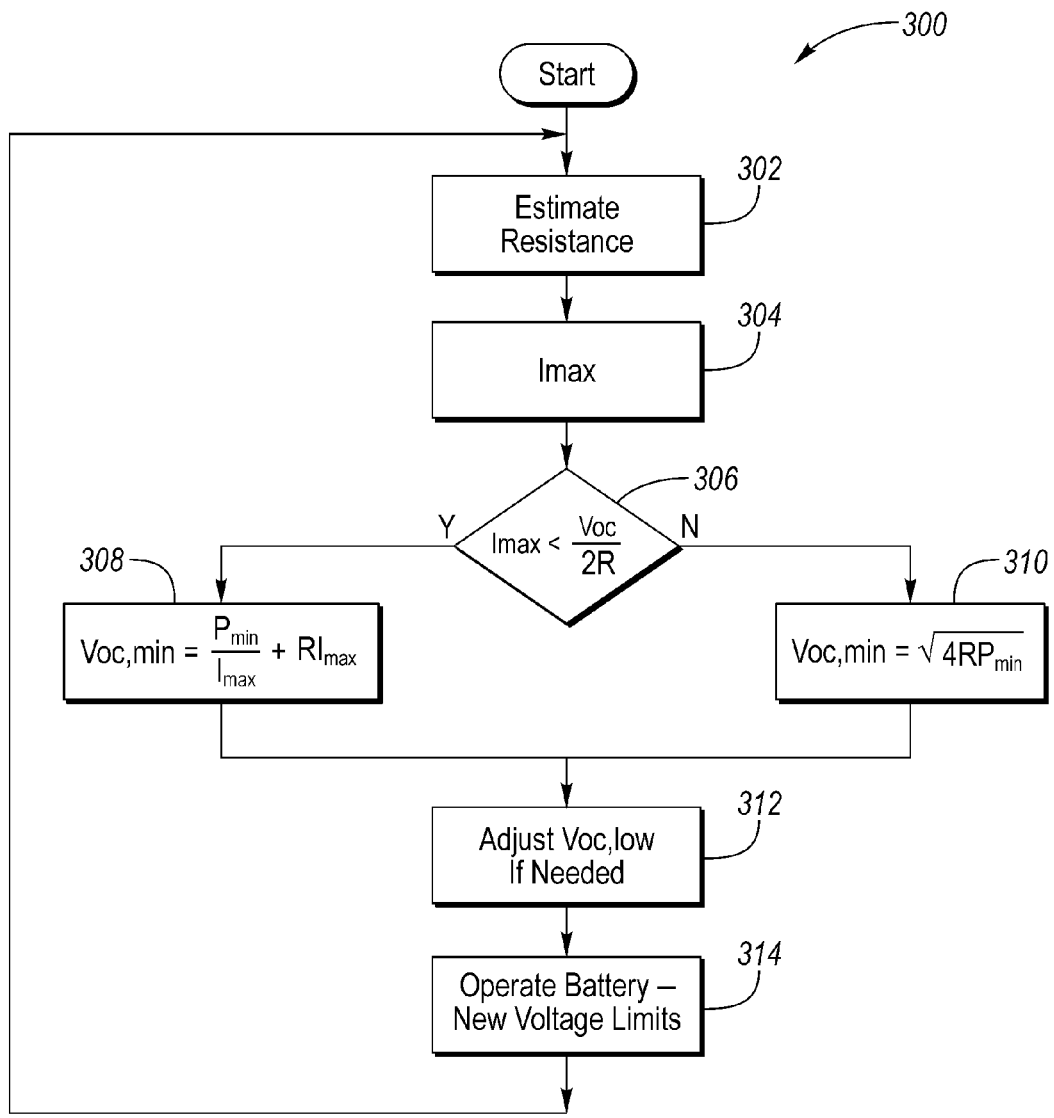
FIG. 6 is a flowchart of a possible set of steps for adjusting a minimum voltage limit and operating a traction battery accordingly.

FIG. 6 depicts a flowchart of a possible method that may be implemented in a controller. The resistance may be estimated 302 using any available technique, such as the possible scheme described earlier. The maximum current may be calculated 304. The maximum current may be a minimum value of a maximum battery current and a maximum current limit of other components (e.g., wiring, fuses). A comparison 306 of the maximum current may be made with the current for maximum power. If the maximum current is less than the current for maximum available power then the minimum voltage limit may be calculated using the current limited formula 308. If the maximum current is greater than or equal to the current for maximum available power, then the minimum voltage limit may be calculated using the maximum power available 310. The minimum voltage limit may then be used to adjust the low voltage limit if necessary 312. For example, if the difference between the low voltage limit and the minimum voltage limit becomes less than a predetermined difference, the low voltage limit may be adjusted such that the predetermined difference is maintained. The battery may then be operated according to the new voltage limits 314. The operation may be such that no power is requested for propulsion when the voltage is less than the minimum voltage limit.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a traction battery; and
   at least one controller programmed to operate the traction battery according to a minimum state of charge that is based on an electrical resistance and a predetermined minimum power for engine cranking such that the predetermined minimum power is available at the minimum state of charge, wherein below the minimum state of charge no power is requested from the traction battery for propulsion.

2. The vehicle of claim 1 wherein the electrical resistance includes an internal resistance of the traction battery.

3. The vehicle of claim 1 wherein the electrical resistance includes a wiring resistance associated with a harness connected to the traction battery.

4. The vehicle of claim 1 wherein the predetermined minimum power includes a safety margin such that a predetermined amount of power is available for engine cranking after a predetermined amount of time in which the vehicle is not operated.

5. The vehicle of claim 1 wherein the at least one controller is further programmed to estimate the electrical resistance.

6. The vehicle of claim 5 wherein the electrical resistance is based on one or more of an age and a usage of the traction battery.

7. The vehicle of claim 1 wherein the minimum state of charge is further based on a maximum current of the traction battery.

8. The vehicle of claim 1 wherein the predetermined minimum power is selected to reduce emissions during engine cranking.

9. A controller-implemented method comprising:
   operating, by a controller, a traction battery according to a minimum state of charge that is based on a resistance of the traction battery and a minimum power capability for engine cranking such that a predetermined minimum power is available at the minimum state of charge, wherein no power is requested from the traction battery for propulsion when a state of charge is below the minimum state of charge.

10. The method of claim 9 further comprising estimating, by the controller, the resistance of the traction battery.

11. The method of claim 9 wherein the predetermined minimum power is a minimum power required to meet emissions standards during engine cranking.

12. The method of claim 9 wherein the predetermined minimum power includes a safety margin such that a predetermined amount of power is available for cranking after a predetermined amount of time in which the traction battery is not operated.

13. A vehicle comprising:
    a traction battery; and
    at least one controller programmed to operate the traction battery according to a minimum voltage that is based on an electrical resistance and a predetermined power for engine cranking such that the predetermined power is available at the minimum voltage, wherein no power is requested from the traction battery for propulsion when a voltage of the traction battery is less than the minimum voltage.

14. The vehicle of claim 13 wherein the minimum voltage is further based on a maximum current of the traction battery, such that when the maximum current is less than a battery current associated with a maximum battery power capability, the minimum voltage is set to Pmin/Imax−R*Imax, where Pmin is the predetermined power, Imax is the maximum current, and R is the electrical resistance.

15. The vehicle of claim 13 wherein the minimum voltage is further based on a maximum current of the traction battery, such that when the maximum current is greater than a battery current associated with a maximum battery power capability, the minimum voltage is set to a square root of 4*R*Pmin, where Pmin is the predetermined power and R is the electrical resistance.

16. The vehicle of claim 13 wherein the predetermined power is selected to reduce emissions during engine cranking.

17. The vehicle of claim 13 wherein the predetermined power includes a safety margin such that a predetermined amount of power is available for engine cranking after a predetermined amount of time in which the vehicle is not operated.

18. The vehicle of claim 13 wherein the at least one controller is further programmed to estimate the electrical resistance of the traction battery.

19. The vehicle of claim 18 wherein the electrical resistance of the traction battery is based on a time in service of the traction battery.

20. The vehicle of claim 13 wherein the at least one controller is further programmed to operate the traction battery according to a minimum state of charge based on the minimum voltage, wherein no power is requested from the traction battery for propulsion when a state of charge of the traction battery is less than the minimum state of charge.

* * * * *